Patented May 16, 1933

1,908,857

UNITED STATES PATENT OFFICE

GEORGE M. NORMAN, OF WILMINGTON, DELAWARE, ASSIGNOR TO HERCULES POWDER COMPANY, OF WILMINGTON, DELAWARE, A CORPORATION OF DELAWARE

NITROSTARCH AND METHOD OF PRODUCING

No Drawing.  Application filed April 15, 1932.  Serial No. 605,552.

As is well known, nitrostarch, which finds use, for example, in explosives, has heretofore been produced by gradually introducing dry, granular starch into a nitrating mixture comprising very strong sulphuric and nitric acids. On completion of the nitration the granular nitrated starch and waste acids are drowned by running into a large quantity of water. The dilute acids are decanted off and the separated nitrostarch treated for its stabilization. The stabilization treatment heretofore has involved boiling with water and with dilute alkali solutions. Due to the difficulty of stabilizing nitrostarch as heretofore produced, it has been customary to utilize, for example, oxalic acid, ammonium salts, cyanogen compounds, etc. in the wash water and alkali solutions with which the nitrostarch is treated in order to render it sufficiently stable to withstand decomposition under storage.

As has been indicated, nitrostarch finds its principal use in explosives as, for example, as an ingredient in so-called nitrostarch dynamites. Explosives including nitrostarch which, for example, in dynamites is substituted for nitroglycerin and hence gives a dynamite which will not freeze in severe weather, have been subject to premature explosion due to the dustiness and sensitiveness of the nitrostarch, which has heretofore produced dust very readily in view of its normally extremely fine state of subdivision.

Aside from the disadvantages of nitrostarch as heretofore produced, principally in danger arising from the very fine state of subdivision of the nitrostarch, the methods heretofore known for its production have been disadvantageous more especially in that due to the drowning of the nitrated starch, necessary for effecting separation of the nitrated starch from the nitrating acids, the nitrating acids are lost and further, due to the extreme difficulty met with in sufficiently stabilizing the nitrated starch product.

Now in accordance with this invention, I have found that nitrated starch free of the disadvantages inherent in nitrated starch heretofore may be produced with avoidance of the disadvantages of prior methods in that the nitrating acids may be readily recovered and the nitrated starch product may be readily efficiently stabilized.

In accordance with this invention porous flake starch or, in other words, starch in porous flake form, is subjected to nitration with a suitable nitrating mixture, as a mixture of strong sulphuric and strong nitric acids. On completion of the nitration the nitrated starch will be readily separable from the nitrating mixture in that it may be filtered from the nitrating mixture or, on allowing the mixture to stand, the nitrated starch will rise to the surface and may be skimmed off. Again, the nitrated starch may be separated from the nitrating mixture by passing a charge through a fine mesh screen. The nitrated starch after separation from the nitrating mixture, will be readily stabilized by washing and boiling with water and finally boiling with dilute alkali solution, there being no necessity to utilize any stabilizers or stabilizing substance to insure desirable stabilization.

As generally illustrative of the preparation of nitrostarch in accordance with the method embodying this invention, for example, a quantity of nitrating mixture is placed in a nitrator of any usual form and cooled to a temperature of about 30° F. A quantity of the flaked starch is then added gradually to the nitrating mixture with stirring and the temperature allowed to rise to about 40° F. After the addition of all the starch to the nitrating mixture, the stirring is continued for about 30 minutes, the temperature being held to between 36–40° F. The nitrating ratios may, for example, be 5 parts of nitric acid and 10 parts of sulphuric acid to one part of flaked starch.

After the nitration is complete the starch will be separated from the nitrating mixture, for example, by allowing the mixture to stand and skimming off the nitrated starch, which will rise to the surface, or by filtering the mixture through a suction filter, or by passing the charge through a wire basket made of a fine mesh screen.

As more specifically illustrative of the method embodying this invention, for example, nitration of the starch flakes, utilizing a nitrating mixture of the composition given above, may be carried out in a vessel or nitrator containing a meshed screen basket say of 60 mesh screen. On completion of the nitration the mixture is allowed to stand until the nitrostarch comes to the surface of the waste acid. The basket is then withdrawn, carrying with it the nitrostarch and leaving the acid mixture substantially free from nitrostarch in the vessel or nitrator. The nitrostarch separated from the waste acid is then put into fresh water under mechanical agitation and prewashed for one-half hour at 160° F. The water is then filtered off and the nitrostarch given a one hour boil with fresh water under agitation, the water removed and the starch given a final boil with, for example, a dilute solution for about one hour. Sufficient sodium carbonate will be used to keep the water alkaline. The nitrated starch will, after separation from the alkaline solution, be dried and will be found to be desirably purified and stabilized.

In carrying out the method in accordance with this invention, for the nitration of starch flakes, the type of nitrostarch produced, that is to say, the nitrogen content, may be controlled by varying the composition of the nitrating acids and the conditions under which nitration is effected.

As illustrative of the control of the type of nitrated starch flakes produced, for example, 26.2 parts of flaked starch is nitrated in 500 parts of an acid mixture made up as follows:

|  | Total | Actual |
|---|---|---|
|  | Percent | Percent |
| $H_2SO_4$ | 61.74 | 60.95 |
| $HNO_3$ | 26.54 | 26.21 |
| $HNOSO_4$ |  | 0.67 |
| $H_2O$ |  | 12.17 |

The nitrated starch will have a nitrogen content of 12.97.

As a further example 20.8 parts of starch flakes are nitrated in 500 parts of acid mixture having the following mixture:

|  | Total | Actual |
|---|---|---|
|  | Percent | Percent |
| $H_2SO_4$ | 62.83 | 62.80 |
| $HNO_3$ | 20.82 | 20.80 |
| $HNOSO_4$ |  | 0.04 |
| $H_2O$ |  | 16.36 |

The nitrated starch flake product will have a nitrogen content of 10.97.

The nitrated starch produced in accordance with and embodying this invention and characterized more specifically by the fact that it is in the form of porous flakes, may be readily stabilized to a highly stable product. Thus, for example, the product when merely washed and boiled in alkaline solution will give a potassium iodide test of 65.5° C., a German test at 135° C. of 23 minutes plus and an explosion test at 135° C. of no explosion in five hours plus, thus indicating an extraordinary high stability.

In proceeding in accordance with this invention involving the nitration of starch flakes, many results and advantages have been obtained which could not be foreseen or predicated by those skilled in the art. Thus, for example, it has been found that the porous flaked starch does not ball up when it comes in contact with the nitrating mixture as did former types of starch and which is highly disadvantageous since the surface of the starch balls become nitrated while the interior is not effected by the nitrating acids, which will not penetrate the balls. Thus, in proceeding heretofore, it has been necessary to break up the balls, which presents great difficulty.

It has been found further and most unexpectedly that the nitrated flaked starch may be readily separated from the nitrating mixture without the necessity for drowning as heretofore, since the nitrated flaked material will rise to the surface of the nitrating mixture on standing, enabling it to be skimmed off, as, for example, in the case of nitroglycerin, or it may be filtered from the nitrated mixture.

Still further, it has been found that the nitrated flaked starch may be readily highly stabilized with ordinary water and alkaline boils as compared with the greater difficulty generally known and recognized in the art in effecting the stabilization of nitrated starch. Still further, it has been found that the nitrated flaked starch is very free flowing and relatively free from dust and that it is a product of very much greater safety in handling and in use than prior forms of nitrostarch, which are prone to dusting which has been the cause of numerous fires and explosions and presents a great hazard.

It will be understood that it is not the intention that this invention be confined to the use of any particular nitrating mixture or to any particular conditions under which the nitrating is effected; such being given in this specification for illustration and clarity of disclosure. Hence, it will be appreciated that the method in accordance with this invention, from the broad standpoint, involves the subjecting of porous starch flakes to nitration, more particularly by the action of a mixture of nitric and sulphuric acids, and that the product involving the invention is essentially characterized and differentiated from the prior art by virtue of its porous flaked physical characteristics.

What I claim and desire to protect by Letters Patent is:

1. The method of producing a nitrated starch which includes subjecting porous starch flakes to nitration.

2. The method of producing a nitrated starch which includes subjecting porous starch flakes to the action of a mixture of nitric acid and sulphuric acid, and separating the nitrated starch flakes from the acid mixture.

3. The method of producing a nitrated starch which includes subjecting porous starch flakes to the action of a mixture of nitric acid and sulphuric acid, and separating the nitrated starch flakes from the acid mixture by filtration.

4. The method of producing a nitrated starch which includes subjecting porous starch flakes to the action of a mixture of nitric acid and sulphuric acid, separating the nitrated starch flakes from the acid mixture, washing the nitrated starch with water and finally boiling the nitrated starch in an alkaline solution.

5. As a new explosive nitrated porous starch flakes.

In testimony of which invention, I have hereunto set my hand, at Wilmington, Delaware, on this 7th day of April, 1932.

GEORGE M. NORMAN.